US011792183B2

United States Patent
Sogawa et al.

(10) Patent No.: US 11,792,183 B2
(45) Date of Patent: Oct. 17, 2023

(54) AUTHENTICATION SYSTEM, USER INFORMATION EXTRACTION APPARATUS, AND USER INFORMATION MIGRATION METHOD

(71) Applicants: Kazuhiro Sogawa, Kanagawa (JP); Sekin Ou, Tokyo (JP)

(72) Inventors: Kazuhiro Sogawa, Kanagawa (JP); Sekin Ou, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 195 days.

(21) Appl. No.: 17/305,738

(22) Filed: Jul. 14, 2021

(65) Prior Publication Data

US 2022/0029977 A1 Jan. 27, 2022

(30) Foreign Application Priority Data

Jul. 27, 2020 (JP) ................................ 2020-126553

(51) Int. Cl.
*H04L 9/40* (2022.01)
(52) U.S. Cl.
CPC ........ *H04L 63/083* (2013.01); *H04L 63/0407* (2013.01); *H04L 63/20* (2013.01)
(58) Field of Classification Search
CPC ... H04L 63/083; H04L 63/0407; H04L 63/20; H04L 63/0892
See application file for complete search history.

(56) References Cited

U.S. PATENT DOCUMENTS

| 2002/0178380 A1* | 11/2002 | Wolf .................. H04L 41/0893 726/4 |
| 2004/0267625 A1* | 12/2004 | Feng ...................... G06Q 10/10 715/733 |
| 2011/0083181 A1* | 4/2011 | Nazarov .................. H04L 63/14 726/23 |
| 2012/0204245 A1* | 8/2012 | Ting ...................... H04L 9/3228 726/8 |

(Continued)

FOREIGN PATENT DOCUMENTS

| JP | 2004-236212 | 8/2004 |
| JP | 2017-102882 | 6/2017 |
| JP | 2017-130760 | 7/2017 |

OTHER PUBLICATIONS

Phiri et al., "Fusion of Multi-Modal Credentials for Authentication in Digital Identity Management Systems", Aug. 2007, The 2nd International Conference on Wireless Broadband and Ultra Wideband Communications, pp. 1-9 (Year: 2007).*

*Primary Examiner* — Kenneth W Chang
(74) *Attorney, Agent, or Firm* — IPUSA, PLLC

(57) ABSTRACT

An authentication system, a user information extraction apparatus, and a user information migration method. The authentication system acquires user information for authenticating a user who uses a device and transmits the acquired user information to the information processing system and the information processing system stores in one or more memory common user information for authenticating a common user who uses the device and another device different from the device, receives the user information from the user information extraction apparatus, and adds the received user information to the common user information stored in the one or more memory.

9 Claims, 17 Drawing Sheets

(56) References Cited

U.S. PATENT DOCUMENTS

| | | | |
|---|---|---|---|
| 2014/0173708 A1* | 6/2014 | Garlick | H04L 63/0853 |
| | | | 726/7 |
| 2015/0288840 A1* | 10/2015 | Ge | H04N 1/00856 |
| | | | 358/1.14 |
| 2017/0126653 A1* | 5/2017 | Lupien | G06F 40/174 |
| 2017/0142191 A1* | 5/2017 | Caldwell | H04L 63/08 |
| 2017/0149788 A1 | 5/2017 | Ohzaki et al. | |
| 2017/0310663 A1* | 10/2017 | Krishan | H04W 12/06 |

* cited by examiner

| TENANT ID | TENANT NAME | ADMINISTRATOR EMAIL ADDRESS | ADMINISTRATOR PASSWORD |
|---|---|---|---|
| T0001 | XXX | xxx@xxx.com | xxx001 |
| T0002 | YYY | yyy@yyy.com | yyy002 |
| T0003 | ZZZ | zzz@zzz.com | zzz003 |
| ⋮ | ⋮ | ⋮ | ⋮ |

FIG. 9

| USER ID | TENANT ID | USERNAME | EMAIL ADDRESS | PASSWORD |
|---|---|---|---|---|
| U0001 | T0001 | AAA | aaa@xxx.com | abcdef |
| U0002 | T0001 | BBB | bbb@xxx.com | bdefs99 |
| U0003 | T0001 | CCC | ccc@xxx.com | defsss |
| . | . | . | . | . |
| . | . | . | . | . |
| . | . | . | . | . |

| DEVICE TYPE ID | DEVICE TYPE NAME | DETERMINATION CONDITION |
|---|---|---|
| D0001 | MFP | X  1-30 |
| D0002 | AD | Y < 20 |
| . | . | . |
| . | . | . |
| . | . | . |

| DEVICE TYPE ID | ITEM 1 | ITEM 2 | ITEM 3 | ITEM 4 |
|---|---|---|---|---|
| D0001 | USER ID | NAME | EMAIL ADDRESS | PASSWORD |
| D0002 | EMAIL ADDRESS | NAME | PASSWORD | USER ID |
| · | · | · | · | · |
| · | · | · | · | · |
| · | · | · | · | · |

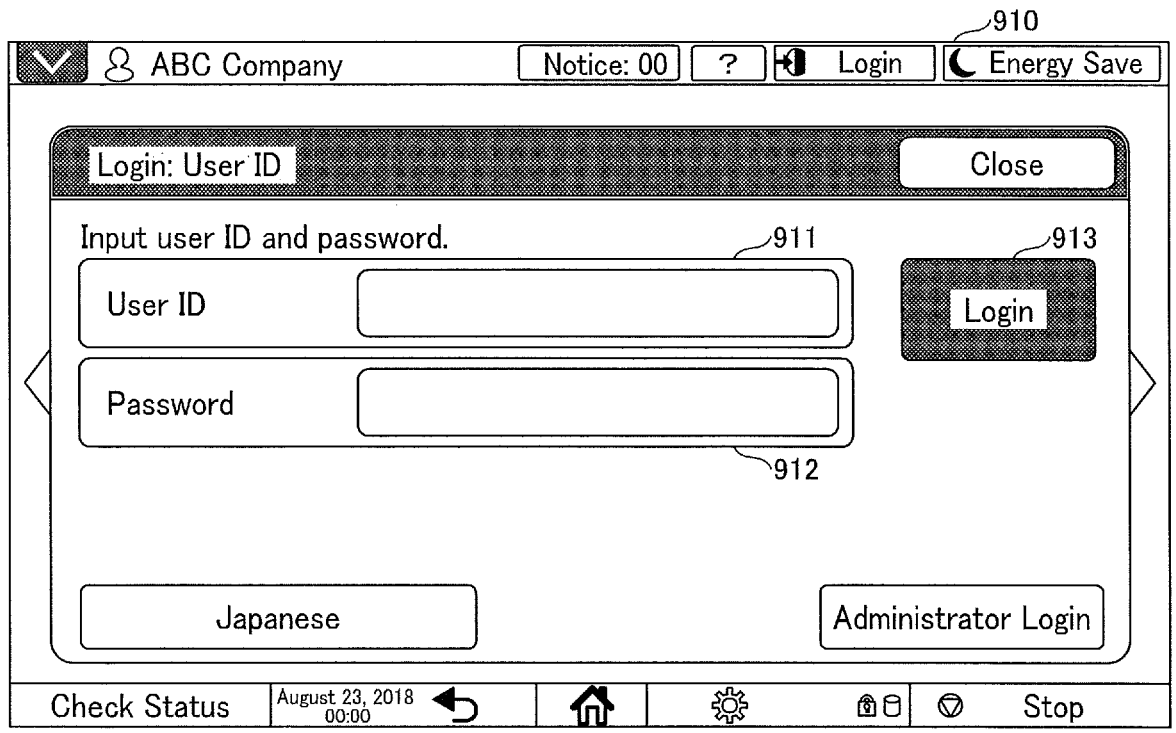

FIG. 16

| USER ID | LANGUAGE SETTING | APPLICATION A SETTING 1 | APPLICATION A SETTING 2 | APPLICATION B SETTING 1 |
|---|---|---|---|---|
| U0001 | ENGLISH | AAA | CCC | EEE |
| U0002 | JAPANESE | BBB | DDD | EEE |
| U0003 | ENGLISH | AAA | DDD | FFF |
| ⋮ | ⋮ | ⋮ | ⋮ | ⋮ |

| USER ID | NAME | EMAIL ADDRESS |
|---|---|---|
| U0001 | AAA | aaa@xxx.com |
| U0001 | BBB | bbb@xxx.com |
| U0001 | CCC | ccc@xxx.com |
| U0002 | AAA | aaa@xxx.com |
| U0002 | BBB | bbb@xxx.com |
| U0003 | DDD | ddd@xxx.com |
| U0003 | EEE | eee@xxx.com |
| U0003 | FFF | fff@xxx.com |
| ⋮ | ⋮ | ⋮ |

| USER ID | DOCUMENT NAME | CREATED DATE AND TIME |
|---------|---------------|------------------------|
| U0001 | image1 | 2020/7/1 10:02 |
| U0001 | image2 | 2020/7/2 12:31 |
| U0002 | log1 | 2020/7/2 10:02 |
| U0003 | xxx1 | 2020/7/4 10:10 |
| U0003 | xxx2 | 2020/7/5 19:51 |
| U0003 | xxx3 | 2020/7/6 14:44 |
| U0003 | xxx4 | 2020/7/6 14:54 |
| ⋮ | ⋮ | ⋮ |

AUTHENTICATION SYSTEM, USER INFORMATION EXTRACTION APPARATUS, AND USER INFORMATION MIGRATION METHOD

CROSS-REFERENCE TO RELATED APPLICATIONS

This patent application is based on and claims priority pursuant to 35 U.S.C. § 119(a) to Japanese Patent Application No. 2020-126553, filed on Jul. 27, 2020, in the Japan Patent Office, the entire disclosure of which is hereby incorporated by reference herein.

BACKGROUND

Technical Field

The present disclosure relates to an authentication system, a user information extraction apparatus, and a user information migration method.

Related Art

An image forming apparatus including an address book function has been developed. The address book function, for example, stores address information such as a destination telephone number in a memory, and when a user inputs a destination keyword and selects a destination telephone number, the selected telephone number is used to, for example, make a facsimile transmission.

Further, an image forming apparatus including a function of user authentication using an address book as user information has been developed. User authentication is a mechanism in which the image forming apparatus can be used by inputting an identifier (ID) and a password registered in the address book. The user information includes information necessary for user authentication such as an e-mail address, ID, password, and function usage restriction information, and information in an address book that can be used by each user.

Also, there is a method of using an Active Directory (AD) server as a method of sharing user information among a plurality of image forming apparatuses in an on-premises environment and performing user authentication. Further, a method of using Active Directory Federation Services (ADFS) or ADFS Proxy as an authentication method using a cloud service by using user information in an on-premises environment is already known.

SUMMARY

Embodiments of the present disclosure describe an authentication system, a user information extraction apparatus, and a user information migration method. The authentication system acquires user information for authenticating a user who uses a device and transmits the acquired user information to the information processing system and the information processing system stores in one or more memory common user information for authenticating a common user who uses the device and another device different from the device, receives the user information from the user information extraction apparatus, and adds the received user information to the common user information stored in the one or more memory.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is a diagram illustrating an example of common user information;

FIG. 10 is a diagram illustrating an example of device type information;

FIG. 11 is a diagram illustrating an example of format information;

FIG. 13 is a diagram illustrating an example of a duplicate confirmation screen;

FIG. 14 is a diagram illustrating an example of an authentication screen;

FIG. 16 is a diagram illustrating an example of setting information according to a second embodiment;

FIG. 17 is a diagram illustrating an example of address book information according to the second embodiment;

FIG. 18 is a diagram illustrating an example of document information according to the second embodiment;

Figure 1:
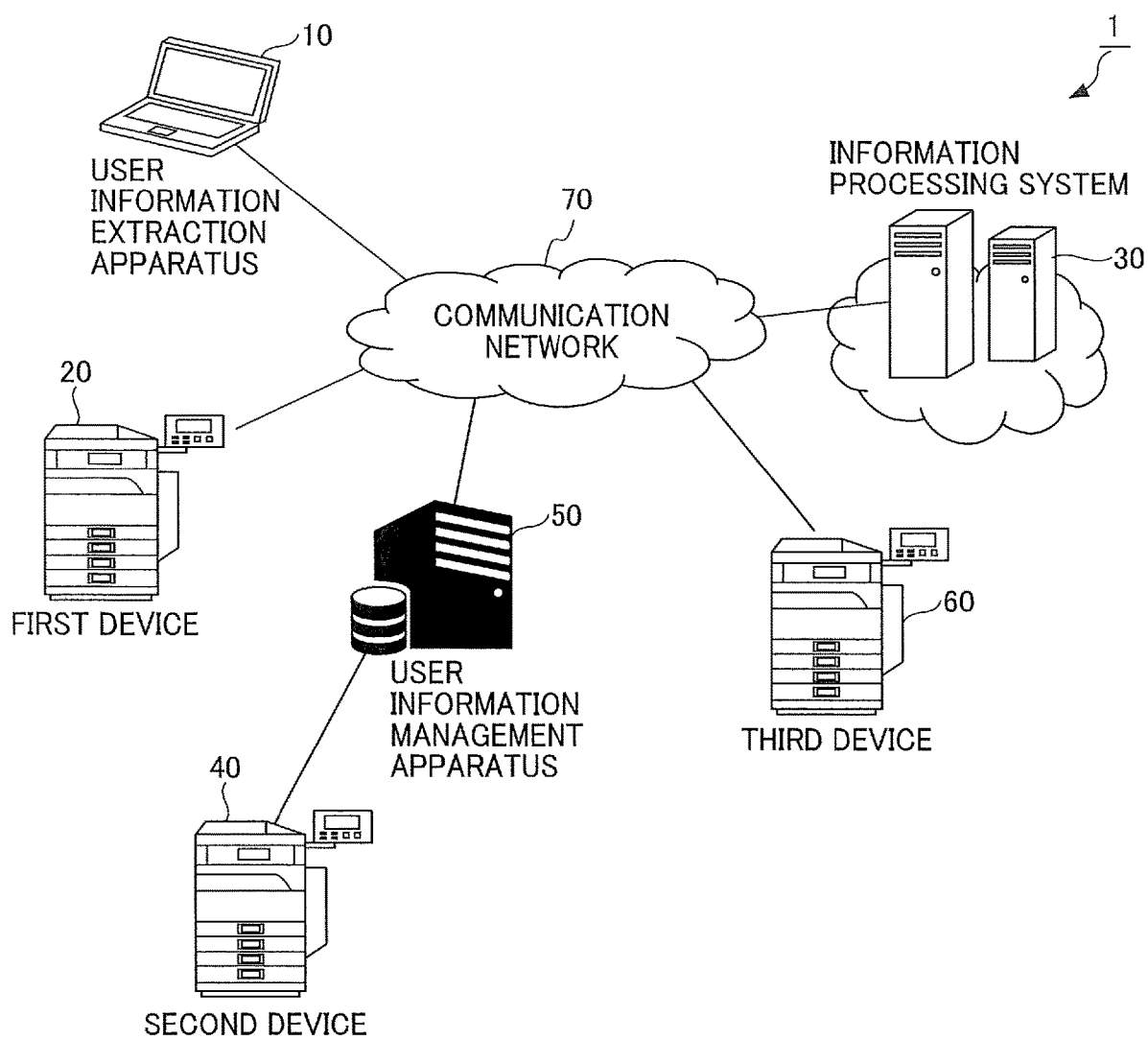
FIG. 1 is a diagram illustrating an example of a system configuration of an authentication system.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of an authentication system according to the present disclosure is described with reference to the drawings.

FIG. 1 is a diagram illustrating an example of a system configuration of an authentication system.

The authentication system 1 includes a user information extraction apparatus 10, a first device 20, an information processing system 30, a second device 40, a user information management apparatus 50, and a third device 60.

The user information extraction apparatus 10, the first device 20, the information processing system 30, the user information management apparatus 50, and the third device 60 are communicably connected to each other through a communication network 70.

The user information extraction apparatus 10 is a device that extracts user information from the first device 20 or the user information management apparatus 50 and migrates the extracted user information to the information processing system 30.

The first device 20, the second device 40, and the third device 60 are devices that implement image forming functions such as scanning, printing, and copying. The first device 20, the second device 40, and the third device 60 each implements an image forming function by itself, and also functions as a web client that uses various functions provided by the information processing system 30.

The first device 20 stores user information for authenticating a user who uses the first device 20.

The information processing system 30 includes, for example, an external linkage function for linking with external services such as user authentication, device authentication, tenant information management, device information management, user information management, screen information management, file management, and cloud storage as basic functions. Further, the information processing system 30 includes various functions including an application programming interface (API) for receiving a request from the first device 20, the second device 40, or the third device 60 and functions as a web service providing system that provides the functions.

The information processing system 30 is, for example, a platform for providing cloud services including various functions. Further, the information processing system 30 is implemented by a plurality of information processing apparatuses, and each of the above functions is distributed and linked by the plurality of information processing apparatuses, but all the functions may be implemented in a single information processing apparatus. Although it is described below that the information processing system 30 executes the processing of each function, the information processing apparatus included in the information processing system 30 actually executes the processing.

Further, the information processing system 30 executes the processing defined in various web application programs (hereinafter referred to as web applications) as the abovementioned cloud service. The web application is an application program that defines the functions provided by the information processing system 30 as a web server to the first device 20, the second device 40, or the third device 60, which are web clients.

Specifically, the information processing system 30 stores common user information for authenticating users who use the first device 20, the second device 40, and the third device 60. The common user information is user information common to the first device 20, the second device 40, and the third device 60. The functions that can be used by an authenticated user are one of the functions provided by the first device 20, the second device 40, and the third device 60, the functions provided by the web application of the information processing system 30, or both. The function provided by the web application of the information processing system 30 is, for example, a portal site customized for each user.

The second device 40 acquires user information for authenticating a user who uses the second device 40 from the user information management apparatus 50. That is, the second device 40 uses the user information managed by the user information management apparatus 50 instead of storing the user information for authentication.

The user information management apparatus 50 stores user information for authenticating the user who uses the second device 40. The user information management apparatus 50 is, for example, an Active Directory (AD) server.

The third device 60 authenticates a user based on the common user information stored in the information processing system 30. That is, the third device 60 uses the user information stored by the information processing system 30 instead of storing the user information for authentication.

The communication network 70 may be wireless communication or wired communication, and may be, for example, a local area network (LAN), a wide area network (WAN), a virtual private network (VPN), the internet, or the like.

A description is now given of an outline of the authentication system 1.

Figure 2:
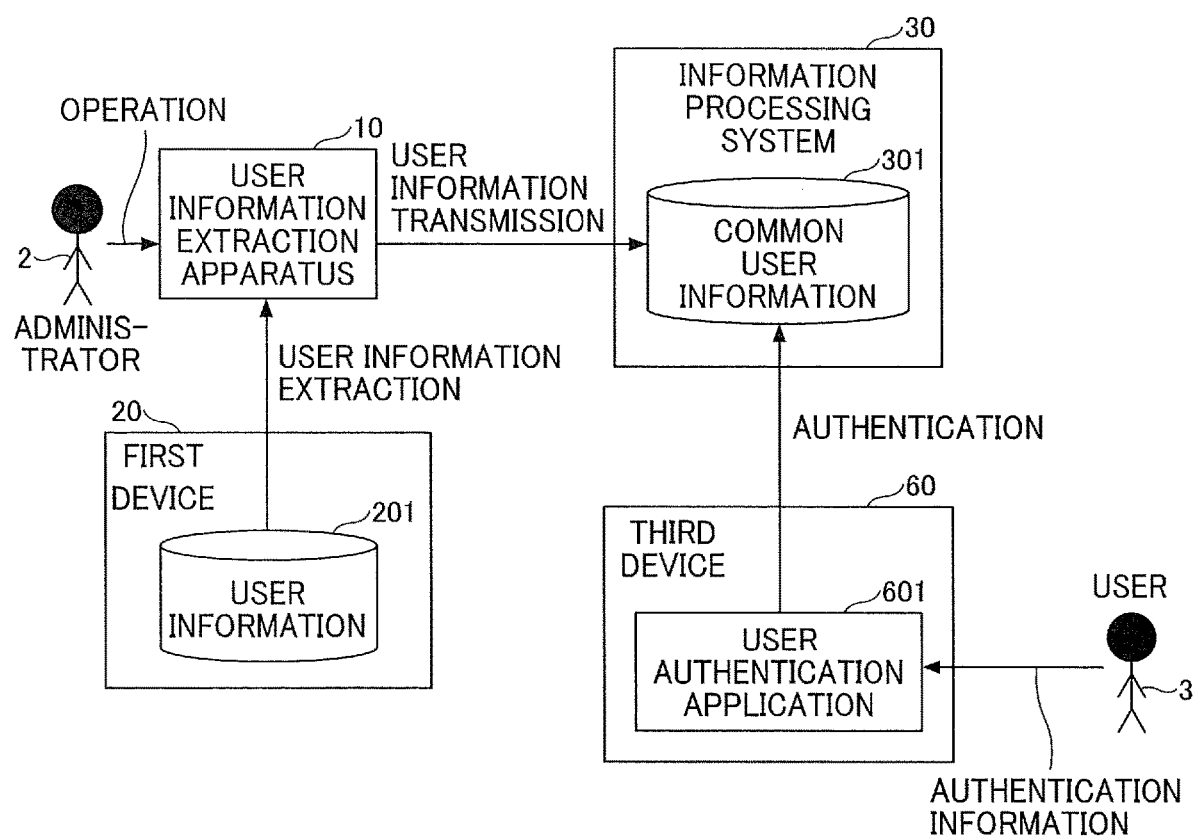
FIG. 2 is a first diagram illustrating an outline of the authentication system.

FIG. 2 is a first diagram illustrating the outline of the authentication system 1.

With reference to FIG. 2, an outline of processing when a user who can use the first device 20 uses the third device 60 is described.

The user information extraction apparatus 10 extracts user information 201 from the first device 20 in response to operation of an administrator 2. Note that the administrator 2 sets information for designating a communication destination such as an internet protocol (IP) address of the first device 20 in the user information extraction apparatus 10 in advance or inputs the communication destination as a part of extraction operation. The user information 201 is an example of the first user information for authenticating the use of the first device 20.

The user information extraction apparatus 10 transmits the extracted user information 201 to the information processing system 30. The transmitted user information 201 is stored in the information processing system 30 as common user information 301.

When the information related to a user 3 included in the user information 201 is stored as the common user information 301, the third device 60 implements the authentication function of the user authentication application 601 by the user 3 operating the third device 60 and inputting the authentication information. As a result, the user 3 can use the function provided by the third device 60 or the information processing system 30.

Figure 3:
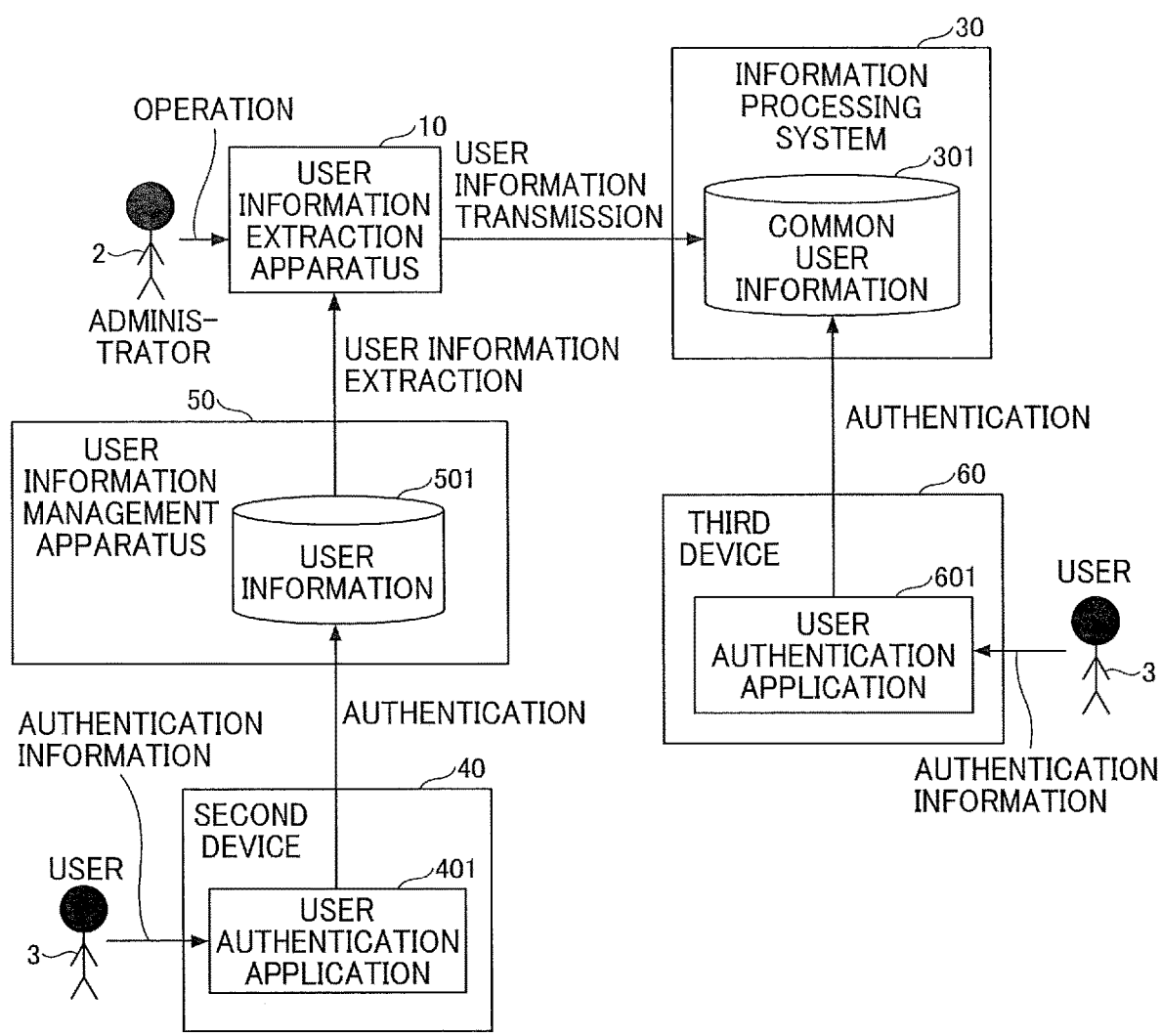
FIG. 3 is a second diagram illustrating the outline of the authentication system.

FIG. 3 is a second diagram illustrating the outline of the authentication system.

With reference to FIG. 3, an outline of processing when a user who can use the second device 40 uses the third device 60 is described.

User information 501 for authenticating the user 3 who uses the second device 40 is stored in the user information management apparatus 50. When the user authentication application 401 of the second device 40 receives an input of authentication information from the user 3, the user authentication application 401 refers to the user information 501 of the user information management apparatus 50 and executes an authentication process. The user information 501 is an example of second user information for authenticating the use of the second device 40.

The user information extraction apparatus 10 extracts the user information 501 from the user information management apparatus 50 in response to the operation of the administrator 2. Note that the administrator 2 sets information for designating a communication destination such as an internet protocol (IP) address of the user information management apparatus 50 in the user information extraction apparatus 10 in advance or inputs the information as a part of extraction operation.

The user information extraction apparatus 10 transmits the extracted user information 501 to the information processing system 30. The transmitted user information 501 is stored in the information processing system 30 as the common user information 301.

When the information related to a user 3 included in the user information 501 is stored as the common user information 301, the third device 60 implements the authentication function of the user authentication application 601 by the user 3 operating the third device 60 and inputting the authentication information. As a result, the user 3 can use the function provided by the third device 60 or the information processing system 30.

A description is given hereinafter of a hardware configuration of each device included in the authentication system 1.

Figure 4:
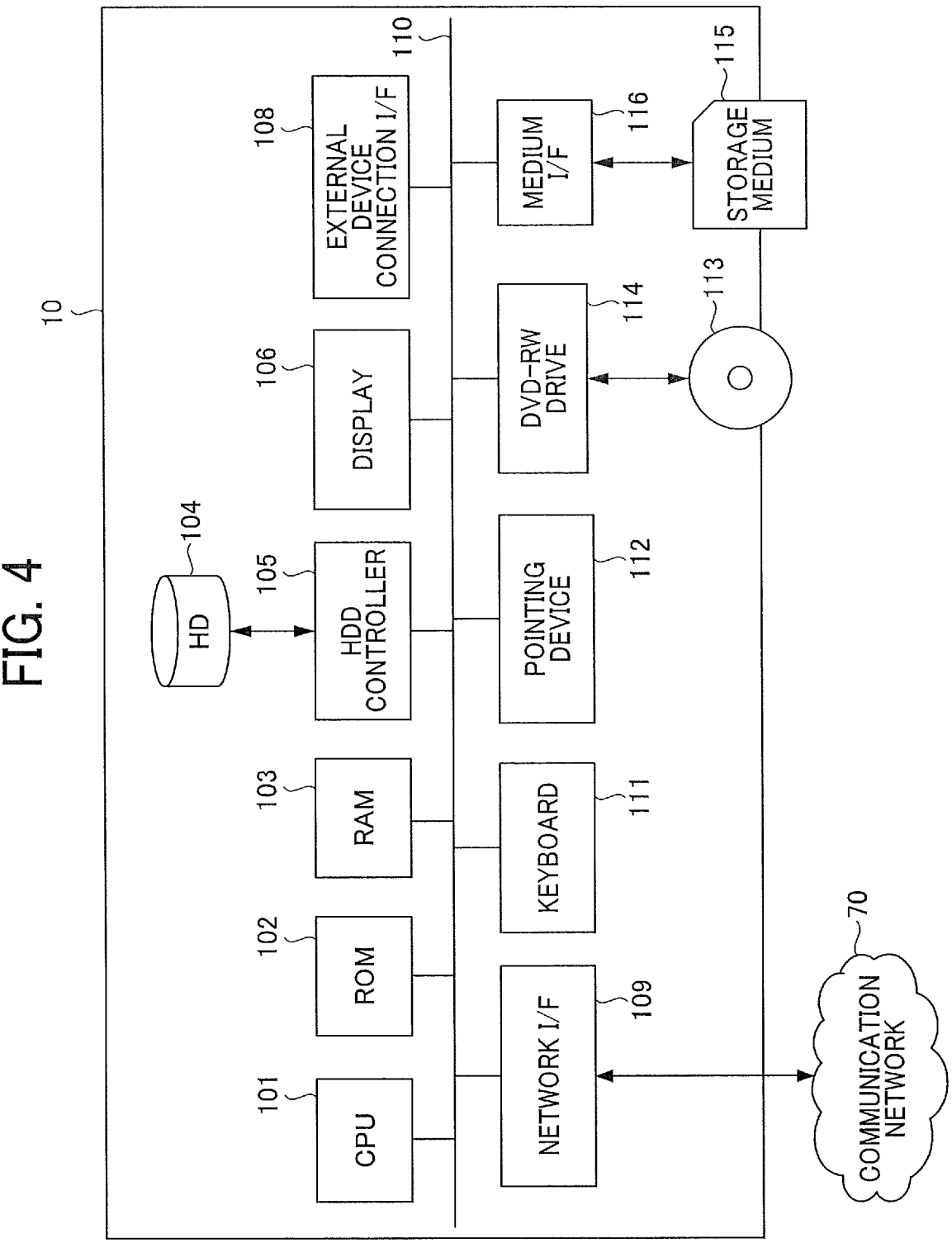
FIG. 4 is a diagram illustrating an example of a hardware configuration of a user information extraction apparatus.

FIG. 4 is a diagram illustrating an example of a hardware configuration of a user information extraction apparatus 10.

The user information extraction apparatus 10 is implemented by a computer including a central processing unit (CPU) 101, a read only memory (ROM) 102, a random access memory (RAM) 103, a hard disk (HD) 104, a hard disk drive (HDD) controller 105, a display 106, an external device connection interface (I/F) 108, a network I/F 109, a bus line 110, a keyboard 111, a pointing device 112, a digital versatile disc rewritable (DVD-RW) drive 114 and a medium I/F 116.

Among the above described elements, the CPU 101 controls all operations of the user information extraction apparatus 10. The ROM 102 stores a program used for driving the CPU 101, such as an initial program loader (IPL). The RAM 103 is used as a work area of the CPU 101. The HD 104 stores programs such as guest network creation application and various other data. The HDD controller 105 controls reading or writing of various data from or to the HD 104 under the control of the CPU 101. The display 106 displays various information such as a cursor, menu, window, characters, or image.

The external device connection I/F 108 is an interface for connecting various external devices. The external device in this case is, for example, a device such as a universal serial bus (USB) memory or a printer. The network I/F 109 is an interface for data communication with other devices using the communication network 70. The bus line 110 is, for example, an address bus or a data bus, which electrically connects the elements such as the CPU 101 illustrated in FIG. 4.

The keyboard 111 is an example of an input device provided with a plurality of keys for allowing a user to input characters, numerals, or various instructions. The pointing device 112 is an example of an input device that allows a user to select or execute a specific instruction, select a target for processing, or move a cursor being displayed. The DVD-RW drive 114 reads and writes various data from and to a DVD-RW 113, which is an example of a removable storage medium. The removable storage medium is not limited to the DVD-RW and may be a digital versatile disc-recordable (DVD-R) or the like. The medium I/F 116 controls reading or writing (storage) of data to the storage medium 115 such as a flash memory.

The information processing apparatus and the user information management apparatus 50 included in the information processing system 30 have the same hardware configuration as the user information extraction apparatus 10 illustrated in FIG. 4.

Figure 5:
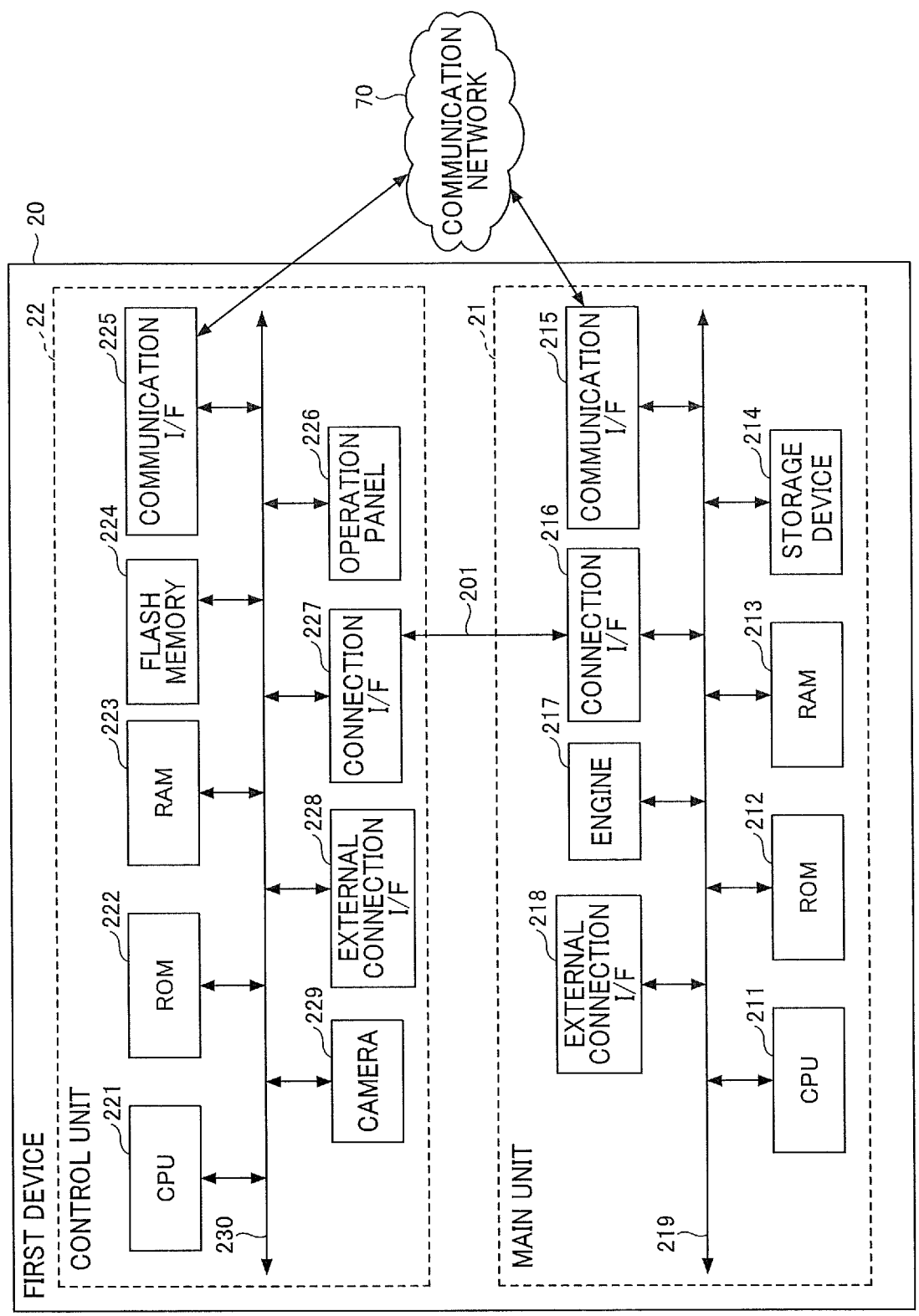
FIG. 5 is a diagram illustrating an example of a hardware configuration of a first device.

FIG. 5 is a diagram illustrating an example of a hardware configuration of the first device 20.

FIG. 5 illustrates an example in which the first device 20 is a multifunction peripheral (MFP). The first device 20 includes a main unit 21 that implements an image forming function, and a control unit 22 that accepts user's operation. Reception of the operation by the user includes accepting information (including a signal indicating a coordinate value of a screen or the like) input according to the operation of the user.

The main unit 21 and the control unit 22 are connected to each other so as to be able to communicate with each other through a communication link 201. The communication link 201 may be in compliance with the USB standard, for example. The communication link 201 may be of a standard other than the USB standard. The communication link 201 may be wired or wireless.

The main unit 21 includes a CPU 211, a ROM 212, a RAM 213, a storage device 214, a communication I/F 215, a connection I/F 216, an engine 217, an external connection I/F 218, a system bus 219, and the like.

The CPU 211 is an arithmetic unit that controls the operation of the entire main unit 21 by executing a program stored in the ROM 212 or the storage device 214 or the like with the RAM 213 as a work area. For example, the CPU 211 uses the engine 217 to implement various functions such as copy, scan, fax, and print.

The ROM 212 is, for example, a non-volatile memory that stores a Basic Input/Output System (BIOS) executed when the main unit 21 is started, various settings, and the like. The RAM 213 is a volatile memory used as a work area for the CPU 211. The storage device 214 is, for example, a non-volatile storage device that stores an operating system (OS), an application program, various data, and the like, and is implemented by, for example, a hard disk drive, a solid state drive (SSD), and the like.

The communication I/F 215 is an interface for a network such as a wireless LAN or a wired LAN for connecting the main unit 21 to the communication network 70 and communicating with an external device. The connection I/F 216 is an interface for communicating between the main unit 21 and the control unit 22 through the communication link 201.

The engine 217 is hardware that performs processing other than general-purpose information processing and communication for implementing the functions such as copy, scan, fax, and print. The engine 217 includes, for example, a scanner (image reading unit) that scans and reads an image of a document, a plotter (image forming unit) that prints on a sheet material such as paper, and a facsimile that performs fax communication. The engine 217 may further include optional equipment such as a finisher that sorts printed sheets, and an automatic document feeder (ADF) that automatically feeds documents to be scanned.

The external connection I/F 218 is an interface for connecting an external device to the main unit 21. The external device may include, for example, an integrated circuit (IC) card reader, a mobile sensor, and the like. The system bus 219 is connected to the above-described components and transmits an address signal, a data signal, various control signals, and the like.

The control unit 22 includes a CPU 221 and a ROM 222, a RAM 223, a flash memory 224, a communication I/F 225, an operation panel 226, a connection I/F 227, an external connection I/F 228, a camera 229, a system bus 230, and the like.

The CPU 221 controls the operation of the entire control unit 22 by executing a program stored in the ROM 222, the flash memory 224, or the like using the RAM 223 as a work area. The ROM 222 is, for example, a non-volatile memory that stores the BIOS executed when the control unit 22 is started, various settings, and the like. The RAM 223 is a volatile memory used as a work area for the CPU 221. The flash memory 224 is, for example, a non-volatile storage device that stores the OS, the application program, various data, and the like.

The communication I/F 225 is an interface for a network such as a wireless LAN or a wired LAN for connecting the control unit 22 to the communication network 70 and communicating with an external device.

The operation panel 226 accepts various inputs according to the user's operation and displays various information. The operation panel 226 is implemented by, for example, a liquid crystal display (LCD) equipped with a touch panel function but is not limited to this configuration. The operation panel 226 may be implemented by, for example, an organic electro luminescence (EL) display device equipped with the touch panel function. In alternative to or in addition to the LCD or the EL display, the operation panel 226 may include an operation unit such as hardware keys or a display unit such as an indicator lamp.

The connection I/F 227 is an interface for communicating between the main unit 21 and the control unit 22 through the communication link 201. The external connection I/F 228 is an interface such as the USB for connecting an external device.

The camera 229 is a photographing device that captures an image of the user. The camera 229 may be installed outside the first device 20 and connected to the control unit 22 through the external connection I/F 228. The system bus 230 is connected to the above-described components and transmits an address signal, a data signal, various control signals, and the like.

When the second device 40 and the third device 60 are MFPs, the hardware configurations of the second device 40 and the third device 60 are the same as the first device 20 illustrated in FIG. 5.

A functional configuration of each device included in the authentication system 1 is described below.

Figure 6:
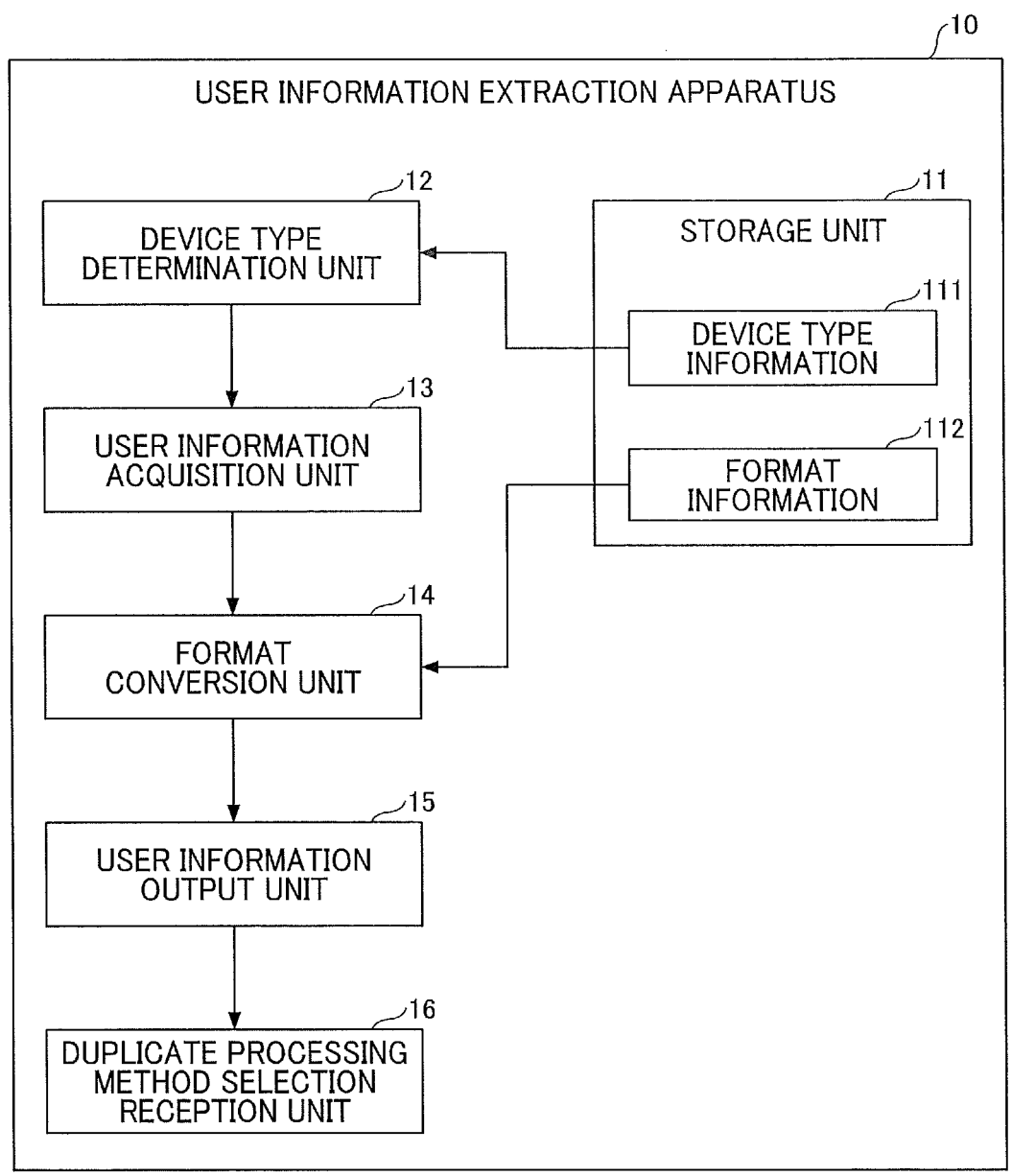
FIG. 6 is a diagram illustrating an example of a function of the user information extraction apparatus.

FIG. 6 is a diagram illustrating an example of the function of the user information extraction apparatus.

The user information extraction apparatus 10 includes a storage unit 11, a device type determination unit 12, a user information acquisition unit 13, a format conversion unit 14, a user information output unit 15, and a duplicate processing method selection reception unit 16.

The storage unit 11 stores various information. Specifically, the storage unit 11 stores device type information 111 and format information 112.

The device type information 111 is information indicating types of various devices including the first device 20, the user information management apparatus 50, and the like. A specific example of the device type information 111 is described below.

The format information 112 is information indicating a format of user information for each type of device. A specific example of the format information 112 is described below.

The device type determination unit 12 determines the type of device based on the device type information 111. Specifically, the device type determination unit 12 requests device information from a user information extraction destination and determines the device type of the extraction destination based on the received device information and the device type information 111.

The user information acquisition unit 13 acquires user information from the first device 20 or the user information management apparatus 50. Specifically, the user information acquisition unit 13 transmits a signal requesting user information according to a protocol defined for each extraction destination device type determined by the device type determination unit 12 and receives the user information sent in response.

The format conversion unit 14 converts the format of the user information with reference to the format information 112. Specifically, the format conversion unit 14 converts to the format of common user information based on the device type determined by the device type determination unit 12. The common user information is user information managed by the information processing system 30.

The user information output unit 15 outputs the user information converted by the format conversion unit 14 to the information processing system 30.

The duplicate processing method selection reception unit 16 receives operation of selecting whether to overwrite information of the user which has duplication. When the duplicate processing method selection reception unit 16 receives a selection to overwrite, the user information output unit 15 outputs the user information to be overwritten to the information processing system 30.

Figures 7, 8:
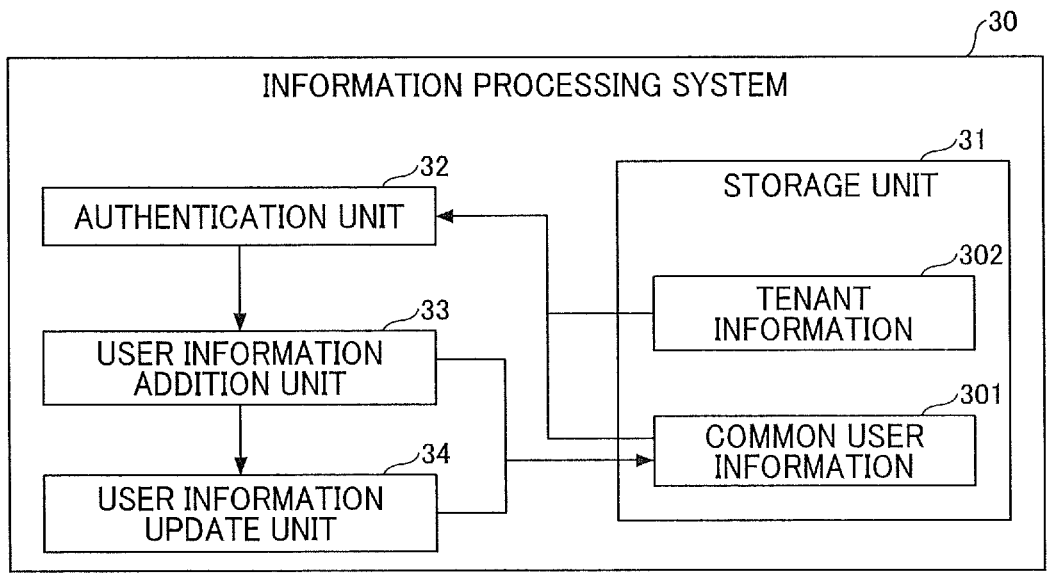
FIG. 7 is a diagram illustrating an example of a function of an information processing system.
FIG. 8 is a diagram illustrating an example of tenant information.

FIG. 7 is a diagram illustrating an example of a function of the information processing system.

The information processing system 30 includes a storage unit 31, an authentication unit 32, a user information addition unit 33, and a user information update unit 34.

The storage unit 31 stores various information. Specifically, the storage unit 31 stores the common user information 301 and the tenant information 302. Specific examples of the common user information 301 and the tenant information 302 are described below.

When the authentication unit 32 receives an authentication request from other devices such as the user information extraction apparatus 10 and the third device 60, the authentication unit 32 executes the authentication process based on the tenant information 302 and the common user information 301, and transmits the authentication result.

The user information addition unit 33 receives the user information from the user information extraction apparatus 10 and adds the user information to the common user information 301 of the storage unit 31. At this time, when a value of an item (user ID or e-mail address described below) in which the user having the same value does not exist is duplicated in the received user information and the common user information 301, the user information addition unit 33 transmits the duplicate user information and the common user information 301 to the user information extraction apparatus 10 without adding the user information.

The user information update unit 34 receives the user information from the user information extraction apparatus 10 and updates the common user information 301 of the storage unit 31.

FIG. 8 is a diagram illustrating an example of the tenant information.

The tenant information 302 includes a tenant ID, a tenant name, an administrator email address, and an administrator password.

The item "tenant ID" is an identifier identifying a particular tenant. The tenant is an organization such as a company, union, etc. to which the user belongs.

The item "tenant name" is the name of the tenant.

The item "administrator email address" is the email address of the administrator who manages the tenant.

The item "administrator password" is the administrator's password.

FIG. 9 is a diagram illustrating an example of the common user information.

The common user information 301 includes a user ID, a tenant ID, a username, an email address, and a password as items.

The item "user ID" is an identifier for identifying the user.

The item "username" is the name of the user.

The item "email address" is the user's email address.

The item "password" is the user's password.

The item "user ID" and the item "email address" are items in which no user has the same value.

FIG. 10 is a diagram illustrating an example of the device type information.

The device type information 111 includes a device type ID, a device type name, and a determination condition as items.

The item "device type ID" is an identifier identifying a particular device type.

The item "device type name" is the name of the device type.

The item "determination condition" is a condition for determining the device type based on the device information received from the device. For example, in the example of FIG. 10, when the device type of the device in which a value of X included in the device information is in the range of 1 to 30, the device type ID is determined to be "D0001".

FIG. 11 is a diagram illustrating an example of format information.

The format information 112 includes a "device type ID" and a plurality of items such as "item 1" and "item 2" as items.

The item "device type ID" is an identifier identifying a particular device type.

The items "item 1", "item 2" and the like are values indicating the names of the items included in the user information.

For example, in the example of FIG. 11, the user information received from the device of the device type "D0001" includes the user ID, the name, the e-mail address, and the password in order as items.

A description is now given of operation of the authentication system 1.

Figure 12:
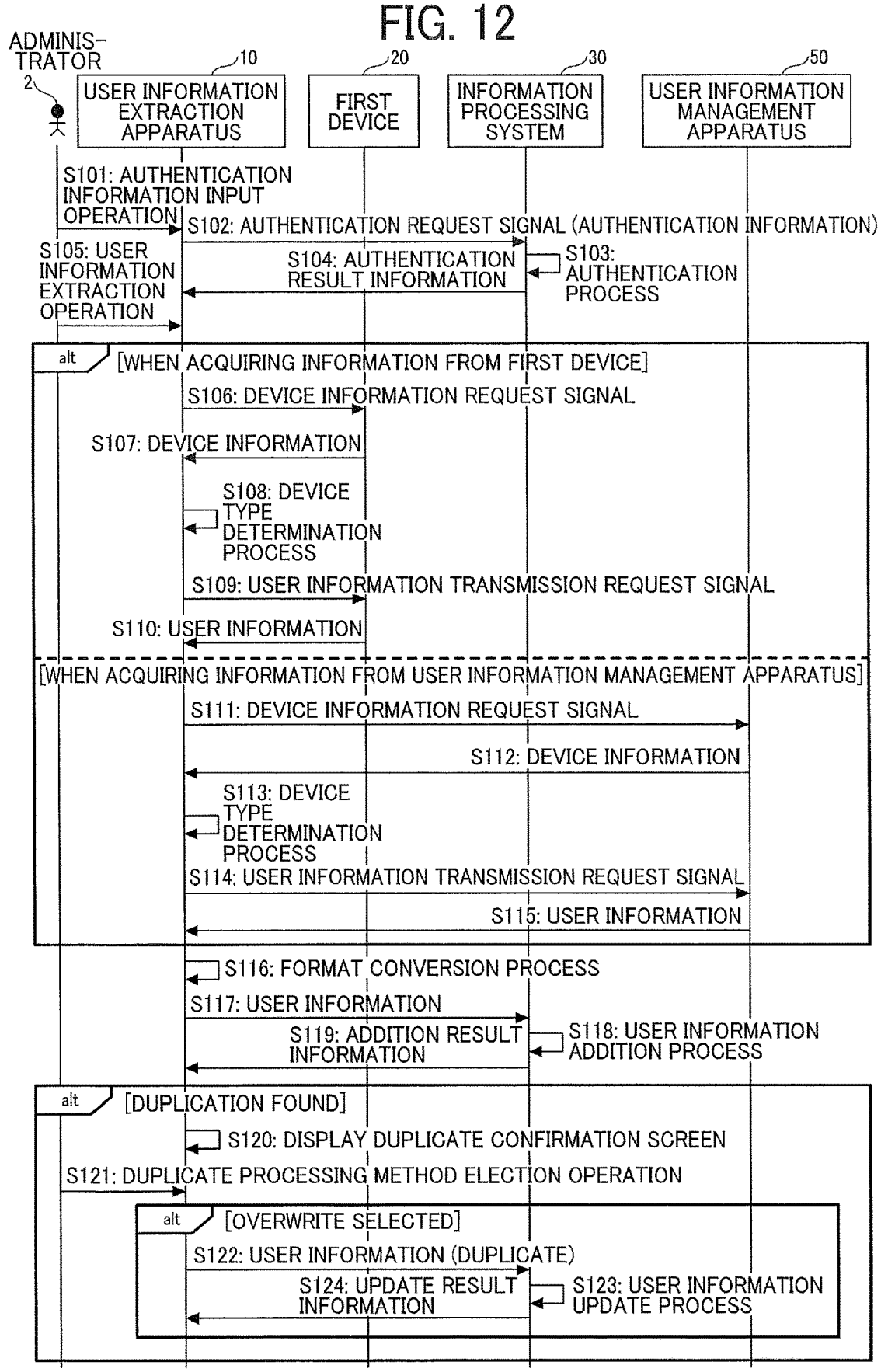
FIG. 12 is a sequence diagram illustrating an example of a user information migration process.

FIG. 12 is a sequence diagram illustrating an example of a user information migration process.

In step S101, the user information extraction apparatus 10 receives an input of authentication information such as a tenant ID and an administrator's email address from the administrator 2. In response, the user information extraction apparatus 10 transmits an authentication request signal including the authentication information to the information processing system 30 in step S102.

The authentication unit 32 of the information processing system 30 executes an authentication process based on the received authentication information in step S103, and transmits information indicating the authentication result to the user information extraction apparatus 10 in step S104. When the result of the authentication is successful, the user information extraction apparatus 10 makes available the function of migrating the user information related to the tenant to which the authenticated administrator belongs.

In step S105, the user information extraction apparatus 10 receives an operation to extract user information from the administrator 2. Here, the IP address of the device that is the source of the user information is designated. As the IP address of the source device, a set value may be stored in advance in the storage unit 11 of the user information extraction apparatus 10.

When the first device 20 is designated as the transmission source of the user information, the device type determination unit 12 of the user information extraction apparatus 10 transmits a signal requesting the device information to the first device 20 in step S106. The first device 20 transmits the device information to the user information extraction apparatus 10 in step S107. The device information is, for example, information defined in a management information base (MIB).

The device type determination unit 12 determines the device type of the first device 20 with reference to the device type information 111 stored in the storage unit 11 in step S108. In step S109, the user information acquisition unit 13 transmits a signal indicating a request for transmitting user information to the first device 20 and receives the user information 201 from the first device 20 in step S110.

When the user information management apparatus 50 is designated as the transmission source of the user information, the device type determination unit 12 of the user information extraction apparatus 10 transmits a signal requesting the device information to the user information management apparatus 50 in step S111. The user information management apparatus 50 transmits the device information to the user information extraction apparatus 10 in step S112.

In step S113, the device type determination unit 12 determines the device type of the user information management apparatus 50 with reference to the device type information 111 stored in the storage unit 11. In step S114, the user information acquisition unit 13 transmits a signal indicating a request for transmitting user information to the user information management apparatus 50 and receives the user information 501 from the user information management apparatus 50 in step S115.

In step S116, the format conversion unit 14 converts the format of the received user information into the format of the common user information 301. In step S117, the user information output unit 15 transmits the user information in the converted format to the information processing system 30.

The user information addition unit 33 of the information processing system 30 adds the received user information to the common user information 301 in step S118, and transmits information indicating the addition result to the user information extraction apparatus 10 in step S119.

Specifically, when the value of the user ID or the e-mail address is duplicated in the received user information and the common user information 301, the user information addition unit 33 does not add the user information and the duplicated user information and the common user information 301 are included in the information indicating the addition result and transmitted to the user information extraction apparatus 10.

When there are duplicated users, the user information extraction apparatus 10 displays a duplicate confirmation screen in step S120.

FIG. 13 is a diagram illustrating an example of the duplicate confirmation screen.

The duplicate confirmation screen 900 includes a duplicate user list 901 that displays the user information (for example, user ID, name, e-mail address, etc.) of a migration source and migration destination, an OK button 902, and a cancel button 903.

The OK button 902 is a button to update the common user information 301 of the migration destination (information processing system 30) with the user information of the migration source for the duplicated user.

The cancel button 903 is a button indicating an instruction not to update the common user information 301 for the duplicated user.

The duplicate confirmation screen 900 illustrated in FIG. 13 is an example. As another example, it may be possible to select whether to update the common user information 301 for each user. Further, it may be possible to select whether to update each item.

Returning to FIG. 12, when the duplicate processing method selection reception unit 16 of the user information extraction apparatus 10 receives an operation of selecting the duplicate processing method by the administrator 2 in step S121 and the OK button 902 is pressed, the user information output unit 15 transmits the duplicate user information to the information processing system 30 in step S122.

The user information update unit 34 of the information processing system 30 updates the user information in step S123, and transmits information indicating the update result to the user information extraction apparatus 10 in step S124.

An example in which the user 3 uses the third device 60 is described. The third device 60 receives an operation from the user 3 and displays an authentication screen.

FIG. 14 is a diagram illustrating an example of the authentication screen.

The authentication screen 910 includes a user ID input field 911, a password input field 912, and a login button 913. The authentication screen 910 may be a screen that accepts input of an email address, personal identification number (PIN) code, etc. instead of the user ID.

Figure 15:
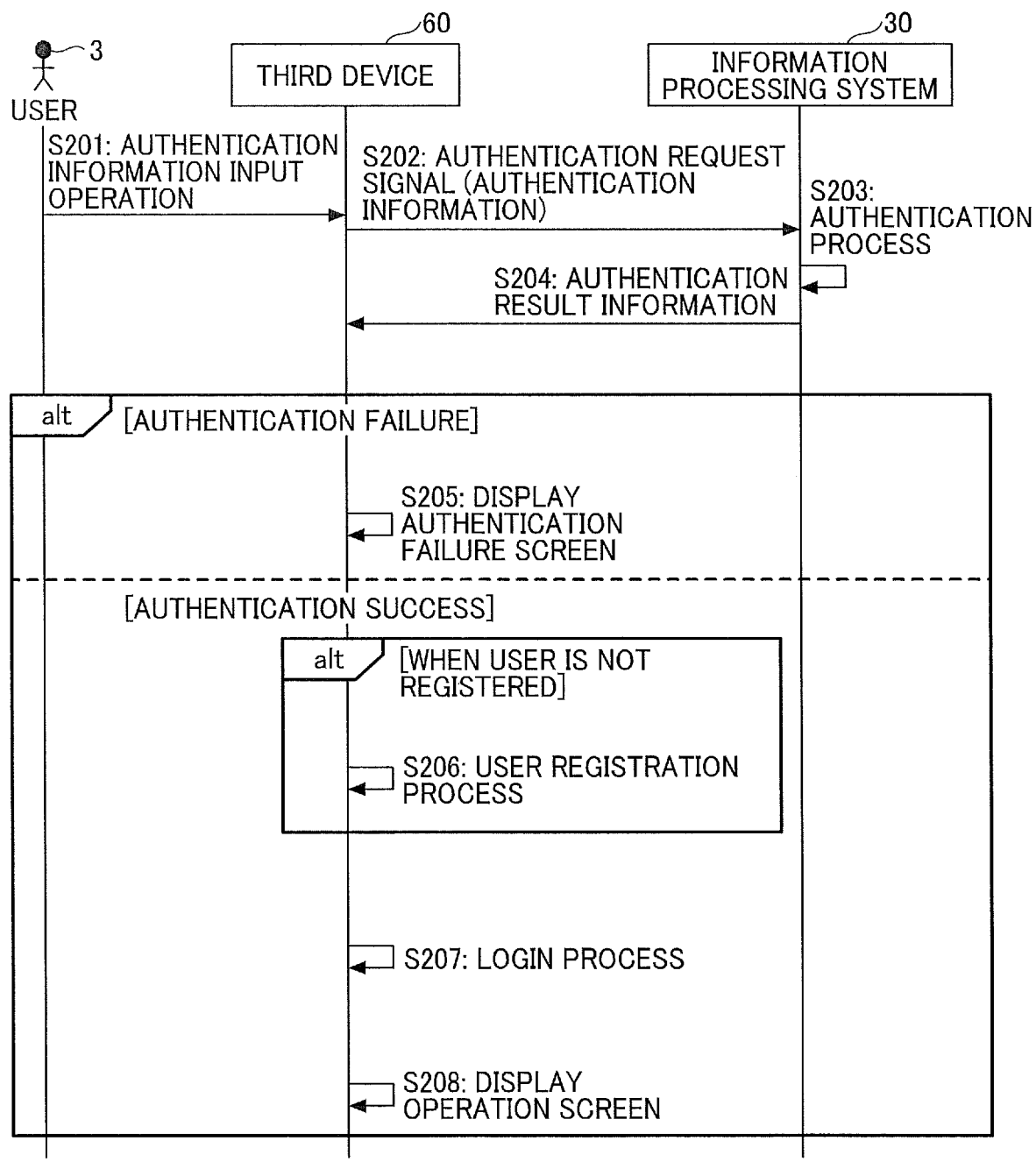
FIG. 15 is a sequence diagram illustrating an example of an authentication process.

FIG. 15 is a sequence diagram illustrating an example of an authentication process.

When the third device 60 receives an input of authentication information from the user 3 in step S201, for example, when the authentication information is input to the user ID input field 911 and the password input field 912 and the login button 913 is pressed in the authentication screen illustrated in FIG. 14, an authentication request signal including the authentication information is transmitted to the information processing system 30 in step S202.

The information processing system 30 executes the authentication process based on the common user information 301 in step S203 and transmits the authentication result information to the third device 60 in step S204.

When the authentication result information indicates an authentication failure, the third device 60 displays a screen indicating the authentication failure in step S205.

When the authentication result information indicates an authentication success, the third device 60 executes a user registration process when the user is not registered as a user of the third device 60 in step S206.

In step S207, the third device 60 executes a login process and displays an operation screen of various functions in step S208.

The third device 60 may limit the functions available to each user. As a result, management of common use permission in a plurality of devices can be implemented by migrating user information.

According to the authentication system 1 of the present embodiment, without creating the user information in the information processing system 30, the user information is extracted from the first device 20 or the user information management apparatus 50 and migrated to the information processing system 30. As a result, a plurality of devices can be used in a simple manner.

A second embodiment is described below with reference to the drawings. The second embodiment differs from the first embodiment in that extended user information is migrated. Therefore, the description of the second embodiment is given of the differences from the first embodiment. The same reference numerals are given to the same or corresponding functions or configurations as those of the first embodiment, and redundant descriptions thereof are omitted or simplified appropriately.

The first device 20 or the second device 40 stores the extended user information which is information for using each device and is information associated with the user. Specifically, the extended user information includes update information updated for each user and additional information added for each user.

The update information is information that is updated for each user and is unique for each user. The update information is, for example, setting information indicating the setting contents of the device for each user.

The additional information is information added and accumulated for each user. The additional information is, for example, address book information indicating the contact information of the user or document information indicating the document used by the user.

FIG. 16 is a diagram illustrating an example of setting information according to the second embodiment.

The setting information 301a is an example of the update information and includes language settings and setting contents of various applications.

The item "language setting" indicates the setting of the language to be displayed on the device.

The items "application A setting 1", "application A setting 2" and the like are set values that define the operation contents of various application programs.

FIG. 17 is a diagram illustrating an example of address book information according to the second embodiment.

The address book information 301b is an example of the additional information, and includes a user ID, a name, and an email address.

The item "user ID" is an identifier for identifying the user.

The item "name" is the name of the user identified by the item "user ID".

The item "email address" is the email address of the user identified by the item "user ID".

FIG. 18 is a diagram illustrating an example of document information according to the second embodiment.

The document information 301c is an example of the additional information, and includes the user ID, a document name, and a creation date and time.

The item "user ID" is an identifier for identifying the user.

The item "document name" is the name of the document used by the user identified by the item "user ID".

The item "created date and time" is the date and time when the document was created.

Figure 19:
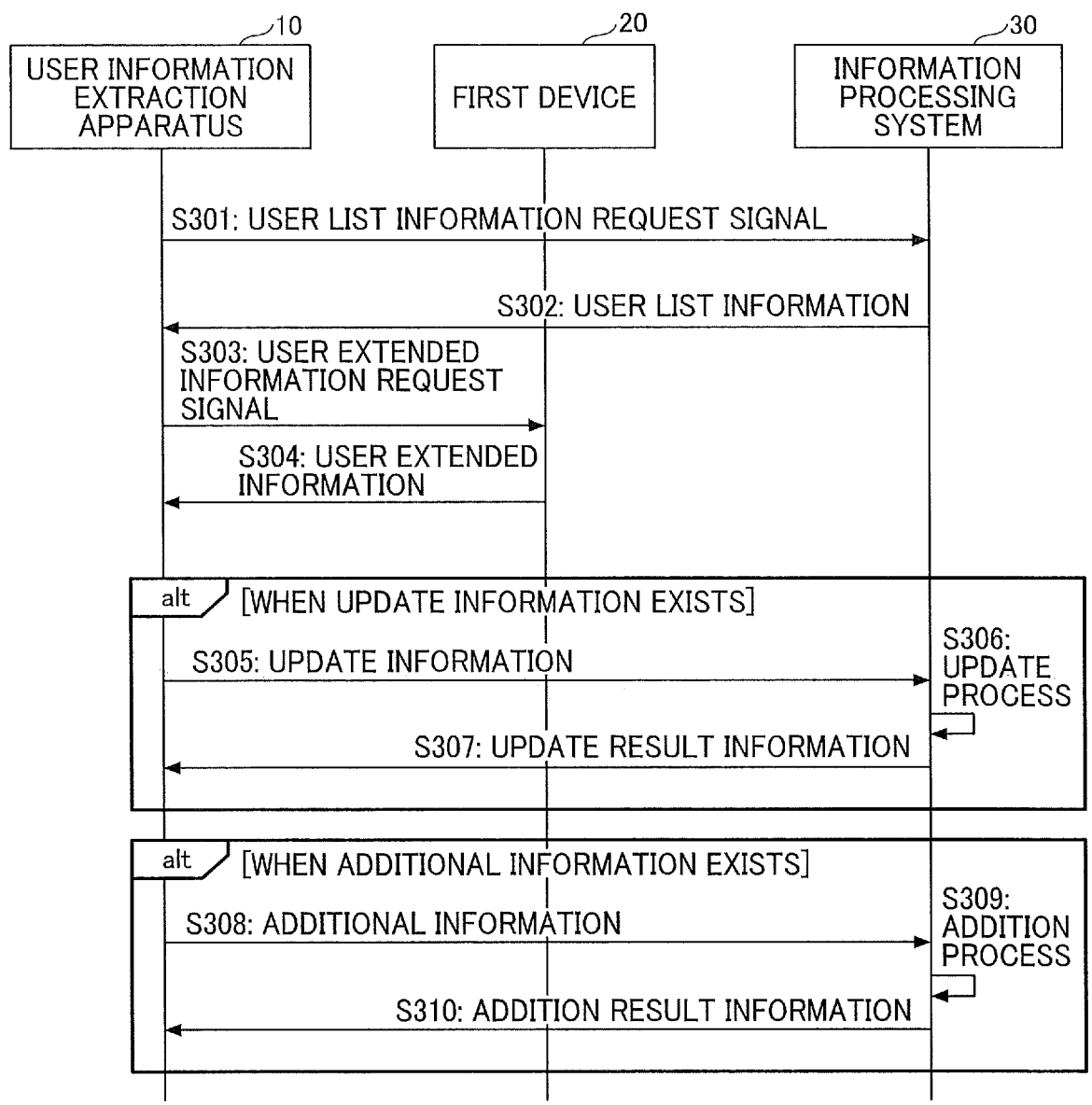
FIG. 19 is a sequence diagram illustrating an example of an extended user information reflection process according to the second embodiment.

FIG. 19 is a sequence diagram illustrating an example of an extended user information reflection process according to the second embodiment.

The user information extraction apparatus 10 according to the present embodiment executes the extended user information reflection process following the execution of the user information migration process according to the first embodiment as illustrated in FIG. 12.

In step S301, the user information extraction apparatus 10 transmits a signal requesting the user list information to the information processing system 30 and receives the user list information in step S302.

In step S303, the user information extraction apparatus 10 transmits a signal requesting the extended user information to the first device 20 and receives the extended user information in step S304.

However, when the user information is received from the user information management apparatus 50, the first device 20 in step S303 and step S304 becomes the second device 40.

In step S305, the user information output unit 15 of the user information extraction apparatus 10 transmits the update information to the information processing system 30 when the update information exists in the extended user information.

The user information addition unit 33 of the information processing system 30 executes an update process in step S306. Specifically, the user update information included in the common user information 301 is updated with the received information. In step S307, the user information addition unit 33 of the information processing system 30 transmits information indicating the update result to the user information extraction apparatus 10.

In step S308, the user information output unit 15 of the user information extraction apparatus 10 transmits the additional information to the information processing system 30 when the additional information exists in the extended user information.

The user information addition unit 33 of the information processing system 30 executes an update process in step S309. Specifically, the received information is added to the additional information of the user included in the common user information 301. In step S310, the user information addition unit 33 of the information processing system 30 transmits information indicating the addition result to the user information extraction apparatus 10.

Figure 20:
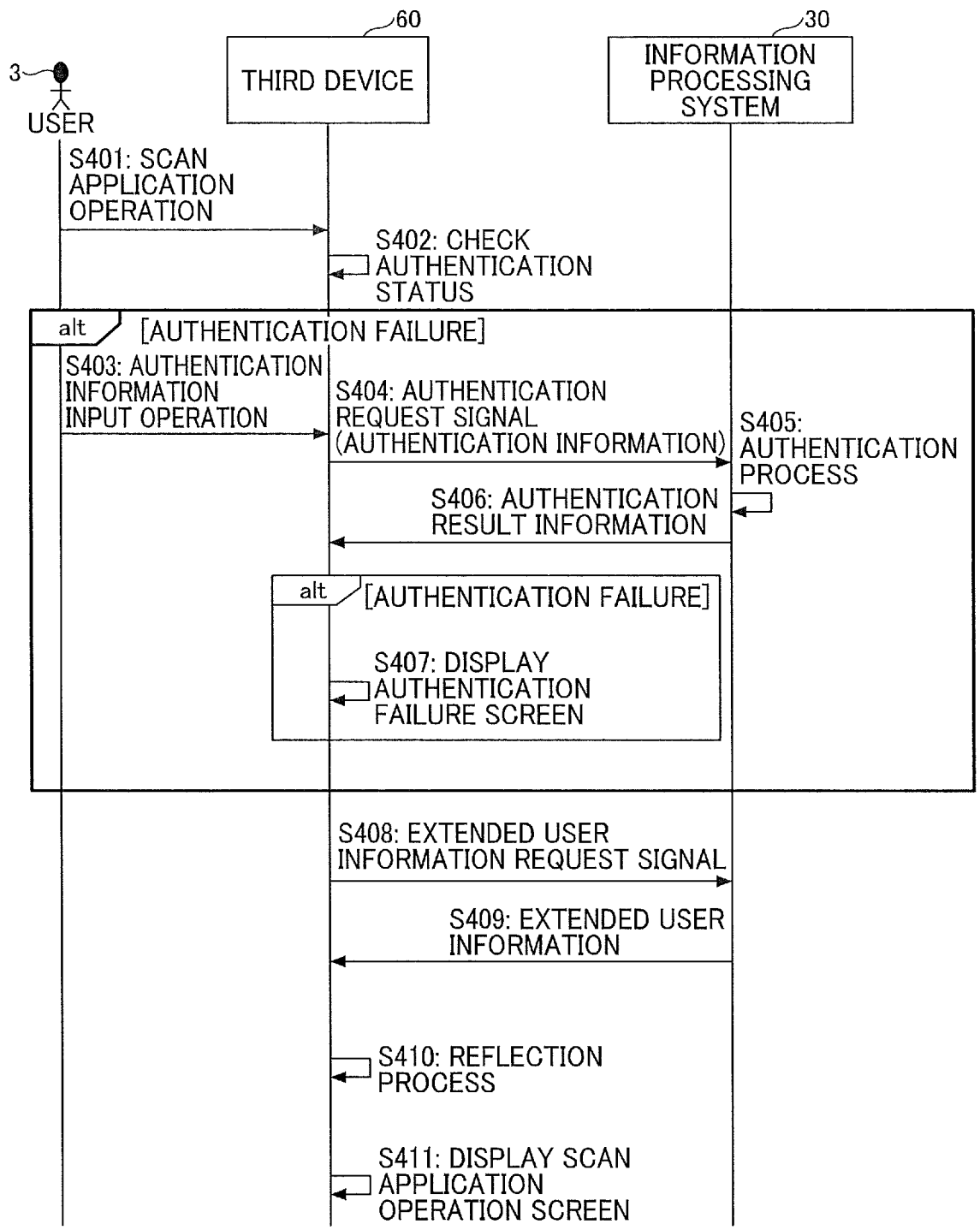
FIG. 20 is a sequence diagram illustrating an example of an application authentication process according to the second embodiment.

FIG. 20 is a sequence diagram illustrating an example of an application authentication process according to the second embodiment.

As an example, when the user 3 executes an operation using the scan application of the third device 60 in step S401, the third device 60 confirms authentication status in step S402.

When the authentication fails, the third device 60 receives an input of the authentication information in step S403 and transmits a signal requesting the authentication to the information processing system 30 in step S404.

The authentication unit 32 of the information processing system 30 executes the authentication process in step S405 and transmits authentication result information to the third device 60 in step S406.

When the authentication result information indicates an authentication failure, the third device 60 displays a screen indicating the authentication failure in step S407.

In step S408, the third device 60 transmits a signal requesting the extended user information and receives the extended user information in step S409. The extended user information here is the address book information indicating a destination to which the scanned document is to be sent.

The third device 60 executes a process that reflects the received extended user information in step S410. Here, the third device 60 stores the acquired address book information.

In step S411, the third device 60 displays a scan application operation screen including the address book information.

Figure 21:
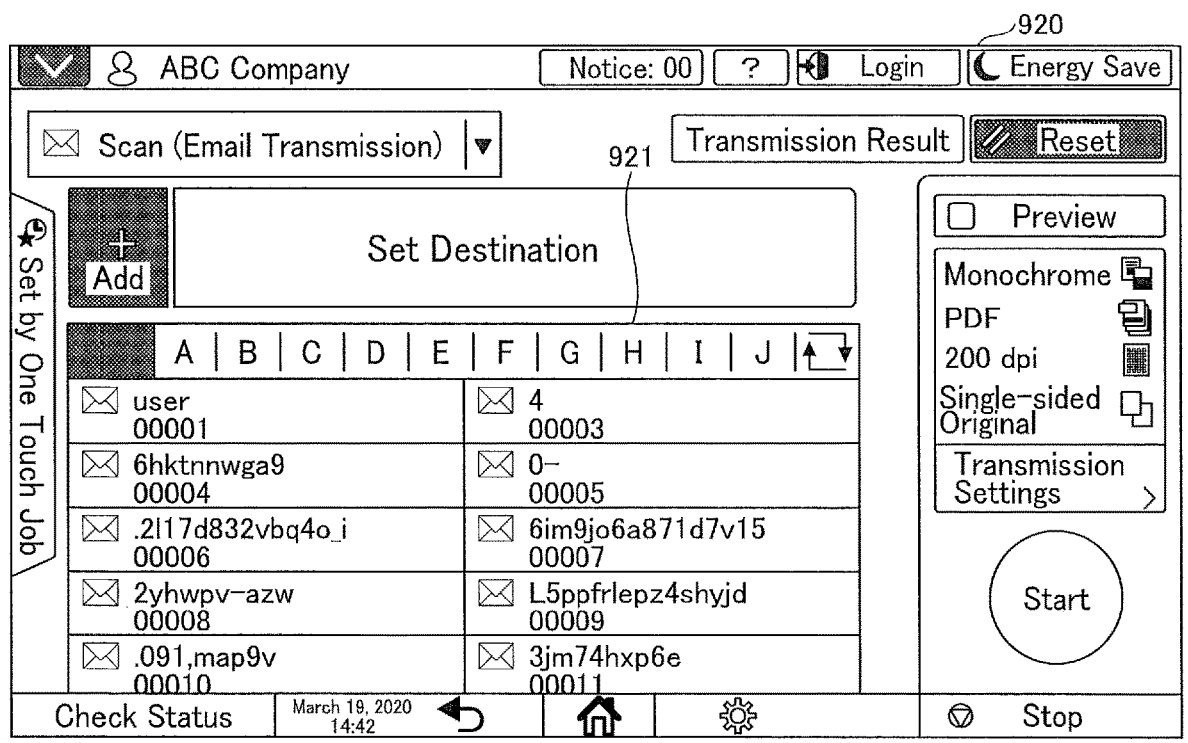
FIG. 21 is a diagram illustrating an example of a scan application operation screen.

FIG. 21 is a diagram illustrating an example of the scan application operation screen.

The scan application operation screen 920 includes a destination list 921.

The destination list 921 is displayed based on the address book information included in the extended user information received in step S409 illustrated in FIG. 20.

According to the authentication system 1 according to the present embodiment, not only the information related to the user authentication, but also various information associated with the user in order to use the device can be commonly used by the plurality of devices.

The apparatuses or devices described in the present embodiments are merely one example of plural computing environments that implement one or more embodiments disclosed herein.

In a certain embodiment, the information processing system 30 may be configured as an information processing system such as a cloud service or a web service including a plurality of computing devices (information processing apparatuses) such as a server cluster. The plurality of computing devices is configured to communicate with one another through any type of communication link, including a network, shared memory, etc., and perform the processes disclosed herein.

Further, the user information extraction apparatus 10 and the information processing system 30 can be configured to share the disclosed processing steps in various combinations. Also, each element of the user information extraction apparatus 10 and the information processing system 30 may be integrated into one server device or may be divided into a plurality of devices.

Each function of the embodiments described above can be implemented by one or a plurality of processing circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

Further, in the embodiments, the description given above is of an example in which the device is implemented by an image forming apparatus. However, the device is not limited to the image forming apparatus as long as the device includes a communication function. The device includes, for example, projectors (PJ), output devices such as digital signage, head up display (HUD) devices, industrial machines, medical devices, network home appliances, connected cars, notebook personal computers (PCs), mobile phones, tablet terminals, game machines, personal digital assistants (PDAs), digital cameras, wearable PCs, desktop PCs, and the like.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

The invention claimed is:

1. An authentication system comprising:
a user information extraction apparatus; and
an information processing system including at least one information processing apparatus connected to the user information extraction apparatus through a communication network, the user information extraction apparatus including circuitry configured to:
acquire user information for authenticating a user who uses a device; and
transmit the acquired user information to the information processing system, and
the information processing system including circuitry configured to:
store in one or more memories common user information in a third format for authenticating a common user who uses the device and another device different from the device;
receive the user information from the user information extraction apparatus; and
add the received user information to the common user information stored in the one or more memories,
wherein the user information includes one of first user information in a first format for authenticating use of a first device, the first user information acquired from the first device, and second user information in a second format for authenticating use of a second device, the second device being different from the first device, the second user information acquired from a user information management apparatus,
when the user information includes the first user information, the circuitry of the user information extraction apparatus is further configured to:
receive device information from the first device;
determine device type of the first device based on the received device information; and
convert the first user information from the first format into the third format of the common user information based on the device type, and
when the user information includes the second user information, the circuitry of the user information extraction apparatus is further configured to:
receive device information from the user information management apparatus:
determine device type of the user information management apparatus based on the received device information; and
convert the second user information from the second format into the third format of the common user information based on the device type.

2. The authentication system of claim 1, wherein the circuitry of the information processing system is further configured to:
when an identifier for identifying the user is included in the user information received from the user information extraction apparatus and the common user information stored in one or more memories, transmit information indicating duplication to the user information extraction apparatus; and
the circuitry of the user information extraction apparatus is further configured to receive an operation to select whether to overwrite information of duplicate user; and
the circuitry of the information processing system is further configured to update the common user information stored in the memories by the user information in response to the selection to overwrite the information of the duplicate user.

3. The authentication system of claim 1, wherein the circuitry of the user information extraction apparatus is further configured to:
acquire extended user information associated with the user for using the device; and
transmit the extended user information to the information processing system, and
the circuitry of the information processing system is further configured to store the extended user information in one or more memories.

4. The authentication system of claim 3, wherein the extended user information includes update information updated for each user and additional information added for each user, and the circuitry of the information processing system is further configured to:
when the extended user information includes the update information, update the update information stored in the memories; and
when the extended user information includes the additional information, add the additional information to the memories.

5. The authentication system of claim 4, wherein the additional information is information indicating a destination for the device to transmit the extended user information.

6. The authentication system of claim 4, wherein the update information is setting information for defining an operation of the device.

7. The authentication system of claim 4, wherein the device is an image forming apparatus.

8. A user information extraction apparatus comprising:
circuitry configured to:
acquire user information for authenticating a user who uses a device; and
transmit the user information to an information processing apparatus that stores in one or more memories common user information in a third format for authenticating a common user who uses the device and another device different from the device, the user information to be added to the common user information,
wherein the user information includes one of first user information in a first format for authenticating use of a first device, the first user information acquired from the first device, and second user information in a second format for authenticating use of a second device, the second device being different from the first device, the second user information being acquired from a user information management apparatus,
when the user information includes the first user information, the circuitry of the user information extraction apparatus is further configured to:
receive device information from the first device:
determine device type of the first device based on the received device information; and convert the first user information from the first format into the third format of the common user information based on the device type, and when the user information includes the second user information, the circuitry of the user information extraction apparatus is further configured to:

receive device information from the user information management apparatus:

determine device type of the user information management apparatus based on the received device information; and convert the second user information from the second format into the third format of the common user information based on the device type.

9. A user information migration method executed by a user information extraction apparatus, the method comprising:

acquiring user information for authenticating a user who uses a device; and transmitting the acquired user information to an information processing system that stores in one or more memories common user information in a third format for authenticating a common user who uses the device and another device different from the device, the user information to be added to the common user information, wherein the user information includes one of first user information in a first format for authenticating use of a first device, the first user information acquired from the first device, and second user information in a second format for authenticating use of a second device, the second device being different from the first device, the second user information being acquired from a user information management apparatus, when the user information includes the first user information, the method further comprising the user information extraction apparatus executing the following:

receiving device information from the first device;

determining device type of the first device based on the received device information; and converting the first user information from the first format into the third format of the common user information based on the device type, and when the user information includes the second user information, the method further comprising the user information extraction apparatus executing the following:

receiving device information from the user information management apparatus;

determining device type of the user information management apparatus based on the received device information; and converting, the second user information from the second format into the third format of the common user information based on the device type.

* * * * *